United States Patent
Rops (10) Patent No.: US 11,199,112 B2
(45) Date of Patent: Dec. 14, 2021

(54) METHOD AND SYSTEM FOR HEAT RECOVERY

(71) Applicant: Nederlandse Organisatie voor toegepast-natuurwetenschappelijk onderzoek TNO, s-Gravenhage (NL)

(72) Inventor: Cornelius Maria Rops, Waalre (NL)

(73) Assignee: NEDERLANDSE ORGANISATIE VOOR TOEGEPAST-NATUURWETEN SCHAPPELIJK ONDERZOEK TNO, 'S-Gravenhage (NL)

( * ) Notice: Subject to any disclaimer, the term of this patent is extended or adjusted under 35 U.S.C. 154(b) by 0 days.

(21) Appl. No.: 16/638,545

(22) PCT Filed: Aug. 17, 2018

(86) PCT No.: PCT/NL2018/050544
§ 371 (c)(1),
(2) Date: Feb. 12, 2020

(87) PCT Pub. No.: WO2019/035714
PCT Pub. Date: Feb. 21, 2019

(65) Prior Publication Data
US 2020/0217227 A1 Jul. 9, 2020

(30) Foreign Application Priority Data

Aug. 18, 2017 (EP) .................................. 17186877
Jan. 22, 2018 (EP) .................................. 18152746

(51) Int. Cl.
*F01K 23/10* (2006.01)
*F01K 25/08* (2006.01)
*F22B 1/18* (2006.01)

(52) U.S. Cl.
CPC .............. *F01K 23/10* (2013.01); *F01K 25/08* (2013.01); *F22B 1/1807* (2013.01)

(58) Field of Classification Search
CPC .......... F01K 23/10; F01K 15/02; F01K 25/08; F01K 13/00; F22B 1/1807; F22B 37/10;
(Continued)

(56) References Cited

U.S. PATENT DOCUMENTS 3,576,179 A    4/1971  Romanos
5,228,515 A *  7/1993  Tran ...................... F28D 9/0037
                                                              165/166
(Continued)

FOREIGN PATENT DOCUMENTS

CN        204345976 U    5/2015
CN        105865089 A    8/2016
(Continued)

OTHER PUBLICATIONS

English Translation EP 0919767 A1 (Year: 1999).*
(Continued)

*Primary Examiner* — Shafiq Mian
(74) *Attorney, Agent, or Firm* — Hoffmann & Baron, LLP (57) ABSTRACT

A method for recovering heat from a flue gas from an engine and a heat recovery system are described. The method involves contacting coolant in a vaporization chamber with a plurality of flow-modifying structures. The structures are arranged in series in the direction of the flow of coolant liquid and are each configured for modifying the flow of the coolant liquid and the vapour in said vaporization chamber.

20 Claims, 5 Drawing Sheets

(58) Field of Classification Search
CPC ........ F22B 1/1815; F22G 3/003; F28D 15/00; F28D 9/00; F28D 1/00
See application file for complete search history.

(56) References Cited

U.S. PATENT DOCUMENTS

| | | | |
|---|---|---|---|
| 2003/0056943 A1* | 3/2003 | Dessiatoun | F28F 3/022 165/142 |
| 2004/0255571 A1* | 12/2004 | Fetescu | F02C 7/1435 60/39.53 |
| 2005/0217834 A1* | 10/2005 | Valensa | F28F 1/126 165/150 |
| 2006/0112693 A1* | 6/2006 | Sundel | F01K 25/10 60/670 |
| 2008/0029257 A1* | 2/2008 | Nilsson | F28F 3/04 165/167 |
| 2009/0229801 A1* | 9/2009 | Stewart | F28D 1/05366 165/151 |
| 2010/0059216 A1 | 3/2010 | Bruckmann et al. | |
| 2011/0000624 A1* | 1/2011 | Rops | F28F 3/048 159/22 |
| 2011/0271677 A1* | 11/2011 | Teng | B60L 50/16 60/715 |
| 2013/0248160 A1* | 9/2013 | Eplee | F28D 9/0025 165/165 |
| 2014/0041839 A1 | 2/2014 | Jackson | |
| 2016/0201519 A1* | 7/2016 | Zhou | F01K 23/101 60/618 |

FOREIGN PATENT DOCUMENTS

| | | | |
|---|---|---|---|
| EP | 0919767 A1 * | 6/1999 | ............ F22B 1/1815 |
| EP | 0919767 A1 | 6/1999 | |
| EP | 2423475 A2 | 2/2012 | |
| GN | 1936488 A | 3/2007 | |
| JP | 2007315323 | 12/2007 | |
| JP | 2007315324 | 12/2007 | |

OTHER PUBLICATIONS

Dai et al., "Parametric Optimization and Comparative Study of Organic Rankine Cycle (ORC) for Low Grade Waste Heat Recovery", Energy Conversion and Management, vol. 50, pp. 576-582; 2009.

Quoilin et al., "Thermo-Economic Optimization of Waste Heat Recovery Organic Rankine Cycles", Applied Thermal Engineering, vol. 31, pp. 2885-2893; 2011.

Schuster et al., "Energetic and Economic Investigation of Organic Rankine Cycle Applications", Applied Thermal Engineering, vol. 29, pp. 1809-1817; 2009.

* cited by examiner

METHOD AND SYSTEM FOR HEAT RECOVERY

This application claims priority from European Patent Office application numbers EP 17186877.1, filed on Aug. 18, 2017, and EP 18152746.6, filed on Jan. 22, 2018, and PCT application number PCT/NL2018/050544, filed on Aug. 17, 2018, all of which are incorporated herein in their entirety.

FIELD

The invention relates to heat recovery. In particular, the invention relates to heat recovery from flue gas by heat exchange against a cooling liquid that is vaporized.

In a preferred embodiment the cooling liquid comprises a mixture, for example a mixture of water with methanol, ethanol, ethanal (acetaldehyde), or ammonia.

BACKGROUND

The recovery of low grade heat is an important objective for the improvement of the energy efficiency of various processes and devices including vehicles. A proposed solution is an Organic Rankine Cycle (ORC). A simple Rankine Cycle system typically comprises an evaporator, an expansion device (such as a turbine or other expander), a condenser and a working fluid pump. In an ORC system, an organic fluid is used with a boiling point occurring at a lower temperature than that of water. In the expansion device, the energy is recovered as work, which can be used to perform mechanical work and/or to generate electricity.

It is desired to increase the amount of energy recovered from the hot fluid stream.

EP0919767 describes a combined gas-steam power plant with a gas turbine cycle and a steam turbine cycle, in which the exhaust gases from the gas turbine give off their residual heat to a steam turbine through a working fluid passing through a forced flow steam generator.

US2014/041839 describes a heat recovery steam generator comprising a housing, an economizer, and an evaporator.

An object of the present invention is to provide a heat recovery method and system that address the above-mentioned desires at least in part.

SUMMARY

The invention relates in an embodiment to a method for recovering heat from a flue gas from an engine, the method comprising: supplying a first fluid, preferably flue gas from the engine, to a first chamber of a heat exchanger, and supplying coolant liquid to a vaporization chamber of said heat exchanger, wherein said coolant liquid vaporizes in the vaporization chamber to give vapour; using the vapour to drive an expansion device, thereby recovering said heat as mechanical work or electrical energy, preferably using a generator; condensing the vapour in a condenser downstream of said expansion device to give condensate, pressurizing the condensate in a pump to give pressurized condensate, and supplying the pressurized condensate to the vaporization chamber as said coolant; wherein in said vaporization chamber said coolant liquid flows in contact with a heat exchanging wall in heat exchanging contact with flue gas in said flue gas chamber thereby causing vaporization of said coolant liquid; wherein said vaporization chamber comprises a plurality of flow-modifying structures that are arranged in series in the direction of the flow of coolant liquid and that are each configured for modifying the flow of the coolant liquid and the vapour in said vaporization chamber, preferably wherein said flow-modifying structures are comprised in said heat exchanging wall, and wherein each of said flow-modifying structures comprises: 1) a first part wherein a channel for coolant is divided in two channels for coolant, and 2) a second part, arranged downstream of the first part, wherein at least two channels for coolant are combined into a single channel for coolant.

Preferably, said coolant liquid in said vaporization chamber and said flue gas in said flue gas chamber are in counter-current flow over said a heat exchanging wall (6), optionally with channels with a diameter of less than 5.0 mm an outlet plenum, and/or staggered row of pillars as described hereinafter.

Preferably, the channels between two flow-modifying structures have a diameter of less than 5.0 mm (or less than 5 mm), or less than 2.0 mm, or less than 1.0 mm, optionally with staggered rows of pillars as flow-modifying structures as discussed hereinafter.

Preferably said heat exchanger comprises an inlet for pressurized coolant liquid and preferably an inlet plenum between said inlet and a first end of said vaporization chamber. Preferably said heat exchanger comprises an outlet for vapour at an opposite second end of said vaporization chamber. Preferably said first and second end define a length of said vaporization chamber between them. Preferably, the heat exchanger comprises an outlet plenum between said second end and said outlet. Preferably, the heat exchanger comprises such inlet, outlet, inlet plenum and outlet plenum.

Preferably said flow-modifying structures are (or comprise) protrusions of said wall into said vaporization chamber. Preferably said vaporization chamber comprises as said protrusions staggered rows of pillars. Hence, preferably, said protrusions are provided as pillars on or provided in said wall. Preferably, said rows are distributed over said length of the vaporization chamber. Preferably in each row the pillars are distributed in width direction transversal to said length. Preferably for a pair of neighbouring rows, the pillars have a different position in said width direction. Preferably the rows of pillars are staggered.

The invention also provides for a heat recovery system comprising such flow-modifying structures. Hence, the invention pertains in an aspect to a heat recovery system comprising: a heat exchanger with a first chamber and a vaporization chamber and a heat exchanging wall between said chambers, and an inlet for pressurized coolant liquid and an outlet for coolant vapor, wherein said inlet and outlet are connected to said vaporization chamber and wherein the first chamber has an inlet and an outlet for a first fluid stream, an expansion device connected to said outlet, wherein the expansion device is preferably (operatively) coupled to a generator, a condenser for condensing vapour arranged downstream of said expansion device, with an outlet for condensate, a pump for pressurizing the condensate, and a connection from said pump to said inlet, wherein said vaporization chamber comprises a plurality of flow-modifying structures that are arranged in series in the direction of the flow of coolant liquid and that are each configured for modifying the flow of the coolant liquid and the coolant vapour in said vaporization chamber, wherein each of said flow-modifying structures comprises: a first part wherein a channel for coolant is divided in two channels for coolant, and a second part, arranged downstream of the first part, wherein at least two channels for coolant are combined into a single channel for coolant.

For the heat recovery system, the same preferences and optional features apply as for the method as disclosed herein.

Preferably, the channels between two flow-modifying structures have a diameter of less than 5.0 mm, optionally with staggered rows of pillars as described herein.

Preferably, the heat exchanger of the heat recovery system comprises the inlet, outlet, inlet plenum and outlet plenum as discussed hereinabove for the method, or all of these. Preferably, flow-modifying structures of the heat exchanger of the heat recovery system are provided as protrusions of the wall, more preferably staggered roles of pillars as described for the method.

BRIEF DESCRIPTION OF THE DRAWINGS

FIG. 2 shows a schematic top view of the vaporization chamber (2A: overview, 2B: expanded portion; 2C: further expanded portion).

FIG. 5 shows a perspective view of two illustrative heat recovery systems (5A, 5B).

DETAILED DESCRIPTION

In an aspect, the invention is broadly based on the judicious insight that the afore-mentioned objective can be met at least in part by using a heat exchanger having on the coolant side channels and structures that break up the flow of the vaporizing coolant in the channels.

The present invention is furthermore based on the judicious insight that the energy recovery can be improved if the pressure of the fluid at the coolant side of the heat exchanger is lower, as then the boiling temperature of the coolant decreases and more heat can be withdrawn from the hot fluid. The pressure of the fluid at the coolant side can in particular be decreased if at the same time explosive bubble growth of the vaporizing coolant, that can more easily occur at lower pressures, is avoided by providing structures in the channels for coolant of the heat exchanger, e.g. corrugations of the channel walls, wherein said structures break up the flow of the coolant.

For example the heat exchanger can be provided on the coolant side with channels as described in US 2011/0000624, such as with a field of pillars as described therein.

For heat recovery, it is desirable that the temperature of the flue gas is higher than the boiling temperature. Accordingly a lower boiling temperature of the coolant allows for better heat recovery and/or heat recovery from lower grade waste heat stream (having a lower temperature), and/or a smaller heat exchange area. The invention provides for this while at the same time avoiding explosive bubble growth.

Currently low pressures in the vaporization chamber are generally not used, i.e. the vaporization chamber is generally kept at high pressure in existing systems so as to reduce the risk of explosive bubble growth. With the flow-modifying structures of the vaporization chamber of the present invention, the risk of explosive bubble growth is reduced and lower pressures can be used. Alternatively and/or additionally, the heat exchange area can be reduced.

As used herein, annular flow refers to flow of a two-phase fluid (vapor and liquid) in a channel with liquid flowing over the walls of the channel and vapor flowing in the centre of the channel.

In a first aspect, the present invention pertains to a method of recovering heat. In particular, (waste) heat is recovered from a first fluid stream, such as from flue gas or exhaust gas, for instance from an engine. The method is based generally on a Rankine cycle. Accordingly, the method comprises heat exchanging the first stream with cooling liquid in a heat exchanger such that the cooling liquid vaporizes in a vaporization chamber, using the vapor to drive a device, condensing the vapor, pressuring the condensate, and recycling the condensate to the vaporization chamber. The device is typically an expansion device that performs mechanical work. In this way the heat of the first stream is recovered as mechanical work or electrical energy. In the present invention, the vaporization chamber is provided with flow modifying structures that generally break up the flow of the coolant, in particular of liquid slugs in the coolant. This helps to reduce the risk of explosive bubble growth of the vaporizing coolant.

Figure 1:
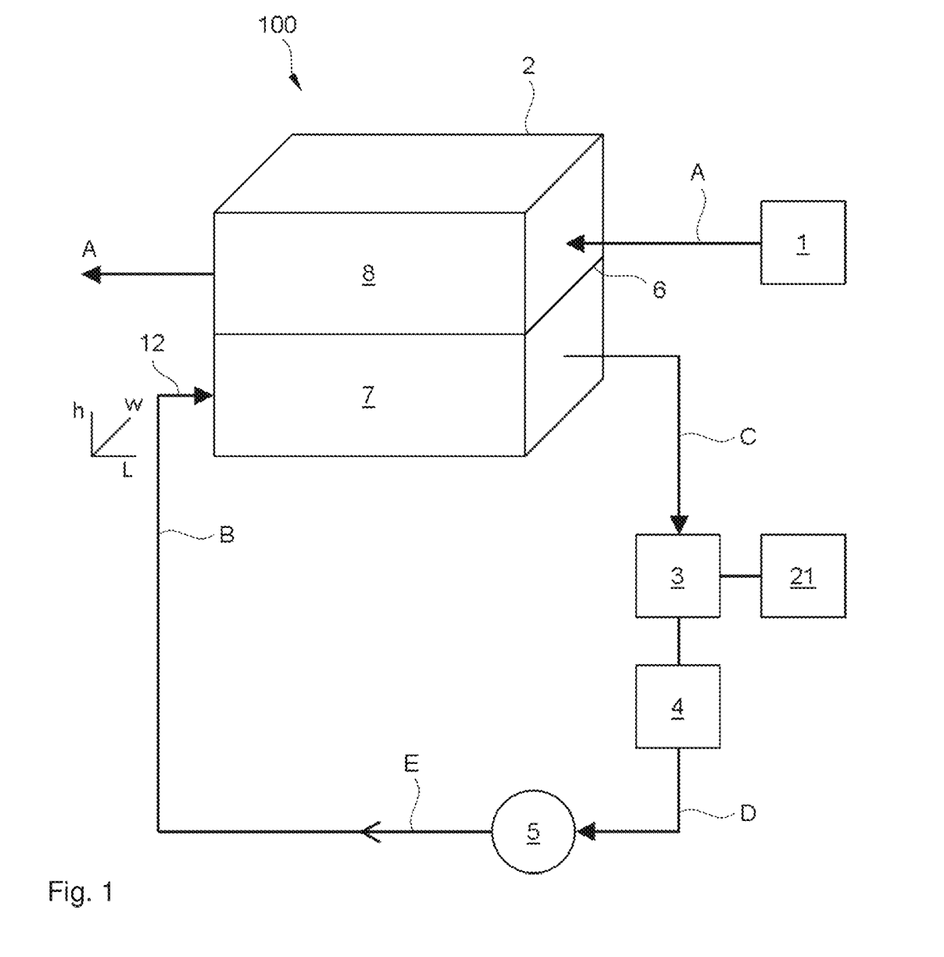
FIG. 1 shows an overview of an illustrative heat recovery system 100.
Figure 2A:
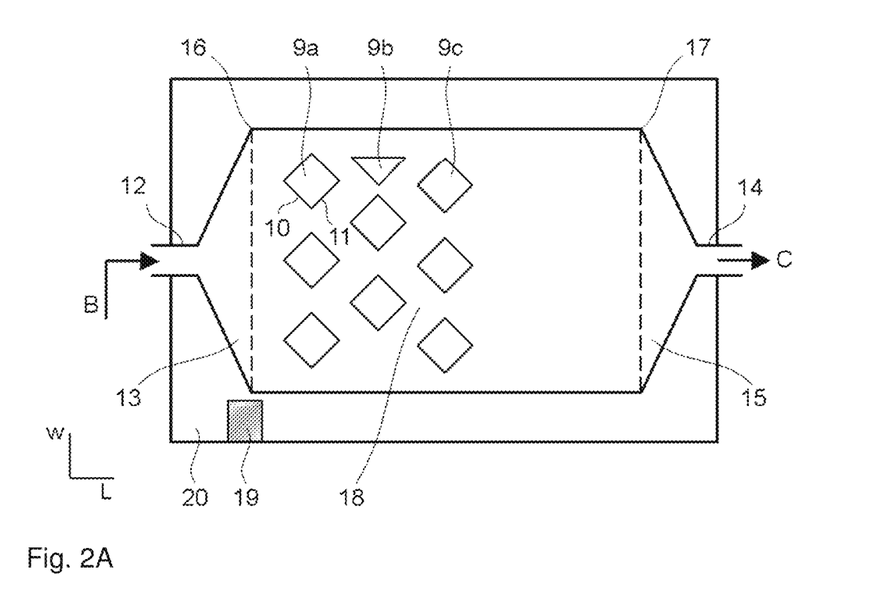
Figure 2B:
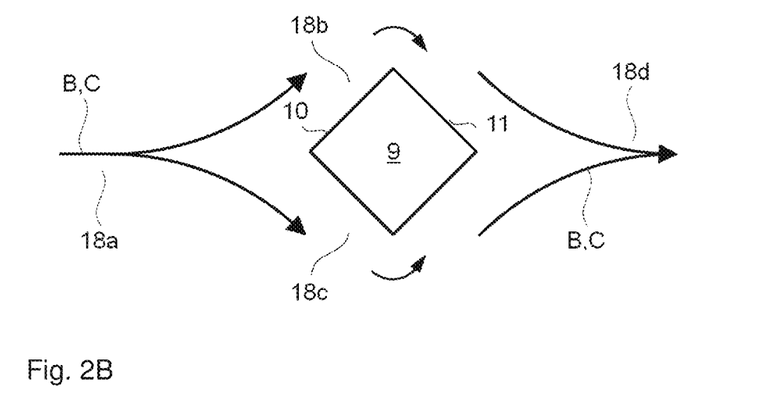

In connection with FIGS. 1, 2A and 2B (each showing an illustrative embodiment not limiting the invention), the method comprises supplying a first fluid stream (A) (gas and/or liquid) from a source (1) to a first chamber (8) of a heat exchanger (2). The fluid stream (A) is preferably flue gas from an engine (1) supplied to a flue gas chamber (8). The fluid from the heat source (1) can also be a liquid e.g. in case of a solar plant. The first fluid stream can for instance also be an intermediate heat transfer fluid, e.g. a liquid. The method further comprises supplying coolant liquid (B) to a vaporization chamber (7) of said heat exchanger (2). The coolant liquid (B) vaporizes in the vaporization chamber (7) to give vapour (C). A stream comprising vapour and optionally coolant liquid B leaves the vaporization chamber (7).

The coolant comprises for instance an organic substance. The coolant typically has a lower boiling point (i.e. boiling point temperature) than water (at the same pressure). The invention implements for instance an Organic Rankine Cycle. Generally, a lower boiling point increases the efficiency of the heat exchanger. Some examples of suitable coolants include alcohols such as methanol, ethanol and propanol, hydrocarbons such as isobutene, pentene and propane; and hydrofluorocarbons such as R143a (1,1,1,2-tetrafluoroethane). The coolant is for instance a (organic) refrigerant compound. Further suitable coolants include water, ammonia and acetone can also be used. Mixtures of these can also be used as coolant, e.g. a mixture of water with an alcohol, aldehyde or with ammonia.

In the vaporization chamber (7) the coolant liquid (B) flows in contact with a heat exchanging wall (6), typically parallel to said wall, in heat exchanging contact with the first fluid stream (flue gas) (A) in said chamber (8). This causes vaporization of at least part of said coolant liquid (B). It is desired that a large amount of coolant vaporizes, with small heat exchange area of said wall (6). A small heat exchange area is desirable in case limited space is available (e.g. in vehicles) and/or to reduce construction costs. It is also desirable to reduce the pressure drop in the first gas stream (A) (so-called back pressure). Accordingly, the method preferably involves using liquids with an intrinsic lower boiling temperature than water as coolant. The method may furthermore preferably involve lowering the boiling temperature by reducing the operating pressure. Reduction of pressure drop over the evaporator allows a lower operating pressure. The pressure in the vaporization chamber is e.g.

reduced by being in the range of 1.0 to 40 bar, or the pressure is less than 20 bar, less than 10 bar, or even less than 5 bar (and typically 1.0 bar or more).

In a further preferred embodiment, the cooling liquid comprises a mixture of a first and a second component, and optionally further components. Preferably the first component is water. Preferably the second component is a compound having a higher volatility than the first component, e.g. a higher volatility than water. Accordingly, the second component can be referred to as "volatile component". Preferably the second component is a compound with a lower boiling point temperature than water (at the same pressure).

Preferably the second component is a fluid, more preferably a liquid at the operating temperature and pressure. Preferred second components include methanol, ethanol, ethanal (acetaldehyde), and ammonia. The coolant comprises e.g. at least 1.0 wt. %, at least 10 wt. % or at least 20 wt. % or at least 50 wt. % water and/or less than 90 wt. % or less than 70 wt. % water. The coolant comprises e.g. at least 1.0 wt. %, at least 10 wt. % or at least 20 wt. % or at least 50 wt. % second component and/or less than 90 wt. % or less than 70 wt. % second component. The mass ratio of the first to the second component is for instance in the range of 1:100 to 100:1, e.g. in the range of 10:1 to 1:10 or in the range of 1:5 to 5:1, or in the range of 1:10 to 1:1 or in the range of 1:1 to 1:10. Preferably the first and the second component are miscible over these ranges. Preferably the coolant liquid is a homogenous mixture of liquids. By using such a mixture as cooling liquid, the boiling point can be reduced, e.g. compared to pure water. This can optionally be combined with reducing the operating pressure to e.g. less than 10 bar.

The first stream is cooled in the first chamber (8) and has desirable a low temperature at the outlet of said first chamber and the temperature decrease of the first stream is desirably large.

The method further comprises using the vapour (C) to drive a device (3). Preferably, the device is an expansion device (3). The expansion device is for instance a turbine or other type of expanded, such as a volumetric expander. An example is a screw expander. In this way, the thermal energy of the first fluid stream (e.g. flue gas) is recovered and/or converted into mechanical energy or electrical energy. The vapor for instance turns a rotor in the expander to produce shaft power. The expansion device 3 is for instance mechanically coupled (e.g. through the shaft) to a generator (e.g. alternator), or to the engine 1.

The method further comprises condensing the vapour (C) in a condenser (4) arranged downstream the device (3) to give condensate liquid (D), and pressurizing the condensate (D) in a pump (5) to give pressurized condensate (E). The pressurized condensate (E) is supplied to the vaporization chamber (8) as said coolant liquid (B). Hence, the coolant is contained in a closed loop.

The system can optionally comprise additional units such as a super-heater for providing superheated steam.

In the present invention, independent of the type of first fluid stream, the vaporization chamber vaporization chamber (7) comprises a plurality of flow-modifying structures (9), and preferably the heat exchanging wall (6) of vaporization chamber (7) comprises the plurality of flow-modifying structures (9). The method comprises a step of contacting the coolant with these structures, in particular because the fluid, e.g. coolant liquid (B), is flowing around these structures through the vaporization chamber. These structures are arranged in series in the direction of the flow of coolant (coolant liquid (B) and vapor (C)). They are arranged for contact with the coolant. The structures 9 are each configured for modifying the flow of the coolant liquid (B) and the vapour (C) in said vaporization chamber (7).

The flow-modifying structures (9) are provided in the part of the vaporization chamber where the coolant in in heat exchanging contact with the first fluid stream (e.g. flue gas (A)) and where the coolant vaporizes. Preferably, at this part of the vaporization chamber, the coolant is in counter-current flow with the first fluid stream (e.g. flue gas (A)) with coolant and first fluid at opposite sides of the heat exchanging wall, e.g. at an angle in the range of 160°-200° between coolant and first fluid stream. In contrast, inlet headers and outlet headers are not comprised in such part of the vaporization chamber, for instance because an inlet header or an outlet header does not comprise a heat exchange wall that in operation has coolant and first fluid (e.g. flue gas) in counter current flow at opposite sides of the wall.

The structures (9) are positioned such that vaporizing coolant contacts multiple of said structures in series, in particular positioned such that vaporizing coolant contacts multiple of said structures in series in a single vaporization chamber. The vaporizing coolant in particular impinges on the structures (9) which are generally protrusions of the wall (6). The structures (9) are spaced apart in the vaporization chamber and the spaces between them define channels (18) for the coolant. The structures are arranged such that coolant flowing in such a channel (18) impinges on a structure (9) and is divided in at least two streams in channels that are separated from each other by a separation, preferably by said structure (9). In addition, the structures (9) are also arranged such that channels (18) are also merged.

Figure 2C:
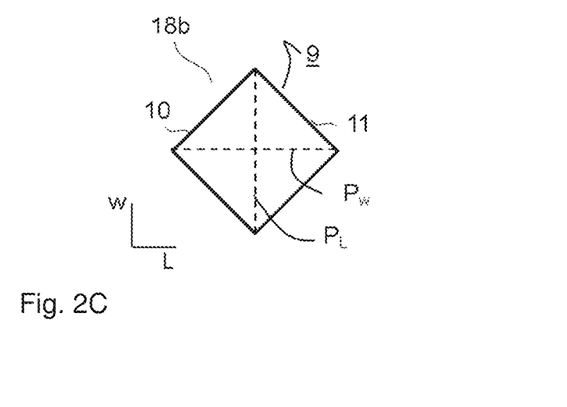

Preferably, the flow-modifying structures each have a width $P_w$ as maximum size in the width direction w and a length $P_L$ as maximum size in the length direction L. The ratio of the length $P_L$ to the width $P_w$ is preferably less than 10:1 or less than 5:1. In contradistinction, lower and upper headers as used in US 2014/0041839 have much longer walls of the tubes separating the channels.

More in particular, each of the flow-modifying structures (9a, 9b, 9c) comprises a first part and a second part, preferably a upstream end part and a downstream end part (with respect to the flow of coolant around the structure). By the first part (10) a channel (18a) for coolant is divided into two channels (18b, 18c) for coolant. Preferably the at least two channels (18b, 18c) are separated from each other by at least a part of said flow-modifying structure. The two channels run for example at an angle in the range of 5° to 85° to the length of the reactor. The second part (11) is arranged downstream of the first part (10) with respect to the flow of coolant. The first part preferably comprises a sharp edge protruding in the upstream direction to break up coolant. By the second part at least two channels for coolant are combined into a single channel for coolant.

The channels (18) and structures (9) provide for increased heat exchange area. Because the channels are typically small (small diameter), the surface tension forces are important relative to inertia. This enhances flow distribution and promotes annular flow. Vapour bubbles and liquid slugs break up on the first part of the structures, promoting an overall bubbly flow pattern and/or annular flow. A flow of the annular flow type reduces large scale oscillations of the flow.

Generally, the flow-modifying structures (9) are protrusions of said wall (6) into said vaporization chamber (7). For instance the wall (6) can be a plate with corrugations at least at the vaporization chamber side of the plate. The plate is typically a metal plate. The structures (9) are for instance integrally formed and unitary with the wall (6).

Preferably the heat exchanger (2) comprises a casing. Preferably the heat exchanger is a plate type heat exchanger. The heat exchanger comprises an inlet (12) for pressurized coolant liquid and typically an inlet plenum (13) between said inlet (12) and a first end (16) of said vaporization chamber (7). The inlet plenum is for instance an inlet manifold. Within this inlet manifold (13) the flow modifying structures (9b) can be arranged in such a way to promote optimal flow distribution in width direction (w), see FIG. 4.

In case of a stacked plate heat exchanger with multiple vaporization chambers (7) and first chambers (8) stacked on each other, the inlet (12) is connected with a plurality of vaporization chambers through said inlet plenum or manifold (13). The heat exchanger (2) furthermore comprises an outlet (14) for vapour (C) at an opposite second end (17) of said vaporization chamber (7). Said first and second end are opposite each other at least along the flow of the coolant. The first end (16) and second end (17) define a length (l) of said vaporization chamber between them. At the outlet (14), the coolant stream may also contain liquid coolant.

The heat exchanger for instance further comprises outlet plenum (15) between said second end (17) and said outlet (14). In case of a stacked heat exchanger, multiple second ends can be connected to an outlet through said outlet plenum. The outlet plenum may further comprise a gas/liquid separation and a separate outlet for coolant liquid.

Preferably the first end (16) is positioned at the place of initial heat exchanging contact between the flue gas (A) and the coolant liquid (B) through wall (6). Preferably the second end (17) is positioned at the place of terminal heat exchanging contact between the flue gas (A) and the vapour (C) in the vaporization chamber (7) through the wall (6), for one passage of coolant through the vaporization chamber.

The method comprises flowing coolant liquid (B) from said first end (16) to said second end (17). During this flow, at least part of the flowing coolant (B, C) is subjected to multiple flow modifications (in series) while flowing in said vaporization chamber (7) from first end (16) and to the second end (17). Each flow modification comprises a step of dividing the flow of coolant into two streams, and a step of combining at least two streams of coolant into a single stream. Preferably, the steps of dividing and combining are alternating.

Figure 3:
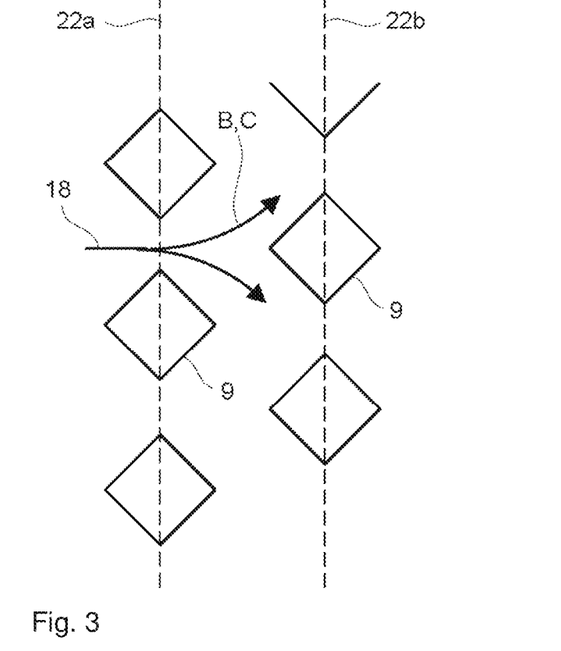
FIG. 3 schematically illustrates a detail of preferred flow-modifying structures used in the invention.

FIG. 3 shows a preferred embodiment of the structures in top view. The vaporization chamber (7) comprises staggered rows (22a, 22b) of pillars (9). The pillars protrude from the wall (6). The rows are distributed over said length (l) of the vaporization chamber (7), i.e. are placed at various positions over the flow path. Typically the centres of the pillars of each row are spaced apart in the length direction between the rows. Each row typically extends in the width direction, and in each row (22) the pillars (9) are distributed and spaced apart in the width direction (w) transversal to said length (l). In each row, the centres of the pillars can have the same or different positions in the length direction. For a pair of neighbouring rows (22a, 22b), the pillars (9) have a different position in said width direction (w). This provides for an arrangement wherein the rows of pillars are staggered. The arrangement in rows is preferably and not necessary. For instance an irregular arrangement of pillars can also be used. The arrangement of pillars is typically staggered and such that from first and to second end, there are at least 1, at least 2, at least 3, or even at least 10 pillars provided at each position in width direction. This avoids that a part of the coolant can flow from first end to second end at one without encountering a pillar.

Preferably, the vaporization chamber (7) is provided with an internal structure. Preferably, the cross section of the evaporation volume is substantially constant along the main flow path for coolant in the vaporization chamber (7) from inlet to outlet of said chamber. This refers in particular to the cross section perpendicular to the flow direction e.g. the length direction. Preferably, the surface area of the flow path for coolant is said cross-section is substantially constant (such as less than 10% difference between minimum and maximum, based on the maximum) in said flow direction. Preferably, the internal structure comprises a regular pattern. For instance, the internal structure is a field (array) of pillars. The pillars for example protrude from the heat exchanging wall (6). Preferably the pillars are arranged in a staggered way.

Preferably, the pillars have in cross section in the plane parallel to said wall (6) a shape that is e.g. diamond shape, rectangular shape, hexagonal, triangular, circle, or elliptical Preferably, the interior of the shape is a convex set, i.e. every point of a line segment that joins a pair of points on said cross-section is inside the pillar. This avoids pillars that are hollow or have indents.

Preferably, the heat exchanger comprises an inlet plenum positioned between the inlet of the heat exchanger for cooling liquid and the vaporization chamber and preferably also a pressure drop inducer preferably between the inlet plenum and the vaporization chamber. Preferably the coolant is not in heat exchanging contact with the first stream in said inlet plenum and in said pressure drop inducer. Preferably, said wall (6) is arranged downstream of said inlet plenum and preferably also downstream of said pressure drop inducer. The pressure drop inducer is e.g. a plurality of flow restriction orifices. The inlet plenum is for example a manifold and is for example provided with fins or other structures to distribute the coolant especially over the width of the vaporization chamber (7).

Preferably the heat exchanger (2) comprises heat flow restriction (19) (e.g. a thermal insulating part 19) in the casing (20) between the inlet 12 and the first end 16, more preferably between the inlet plenum 12 and the first end, even more preferably between the pressure drop inducer and the first end (16). The heat flow restriction is for instance a section of the casing of the vaporization chamber provided with thermal insulation material and/or with air gaps such as slots cut away in the casing (20). This prevents premature vaporization of the coolant liquid B upstream of the first end (16). The heat flow restriction is a part of the casing that has lower heat conductivity (in the direction parallel to the coolant flow) such as by having a reduced conduction area and/or material with lower thermal conductivity than the material of the wall (6).

Preferably, the channels between two flow-modifying structures have a diameter of less than 10 mm, more preferably less than 5 mm (or less than 5.0 mm), or less than 2.0 mm, or less than 1.0 mm. A typical lower limit for the coolant channels is 10 µm.

In a preferred embodiment, the coolant is or comprises ethanol. In a preferred embodiment, the method comprises evaporating at least 1.0 g coolant or at least 10 g coolant (e.g. ethanol) per second, or at least 20 g/s or at least 40 g/s in the heat exchanger (which can have a plurality of heat exchanging walls 6 and stacked chambers 7, 8), e.g. if the coolant is or comprises ethanol. The coolant for example comprises water and ethanol. The coolant preferably comprises at least 20 wt. % or at least 50 wt. % ethanol. In a preferred embodiment, the distance between the first and second end is 5 to 100 cm, more preferably 10-50 cm. These amounts of evaporated coolant, in particular ethanol, with such dimensions of the channel and the length are for instance suitably used in a vehicle such as a car. The pressure in vaporization chamber is e.g. at least 1 bar (1.0 bar) and/or up to 40 bar or up to 20 bar. The pressure in the vaporization chamber is preferably less than 10 bar, more preferably less than 5 bar. Accordingly, the pressure of the pressurized coolant at the inlet 12 is for instance in the range of 1 to 20 bar, preferably 1-10 bar or 1-5 bar.

The invention also pertains to a heat recovery system (100). The heat recovery system preferably has the features as described above in connection with the method. However, the invention also pertains to the heat recovery apparatus. The apparatus is preferably used for the methods as described. The apparatus can be operated with any suitable fluids as coolant and as first stream from a heat source. In the following, the heat recovery apparatus will be further described. The reference numerals to the drawings are for convenience and are not to be construed as limiting. The heat recovery system or apparatus (100) comprises a heat exchanger (2) with a first chamber (8) and a vaporization chamber (7). The chambers are separated by a wall (6) between said chambers. The wall (6) allows for indirect heat exchange and is impermeable to fluids, the wall (6) is typically a metallic part. The heat exchanger further comprises an inlet 12 for pressurized coolant liquid and an outlet (14) for coolant vapor. The inlet 12 and outlet 14 are connected to the vaporization chamber (7). The first chamber has an inlet and an outlet for a first fluid stream. The system further comprises an expansion device (3) connected to said outlet (14). The expansion device (3) is preferably coupled to a generator (20). The expansion device is for instance a turbine or other type of expander such as volumetric expanders, sliding vane expansion machines, screw expanders, scroll expanders.

The system further comprises a condenser (4) for condensing the vapour. The condenser (4) is arranged downstream of said expansion device 3. The condenser (4) has an inlet for vapor connected to an outlet of the expansion device. The condenser is for example a heat exchanger, for instance for heat exchange against ambient air. The condenser (4) has an outlet for condensate.

The system furthermore comprises a pump (5) for pressurizing the condensate, and a connection for flow of the condensate from said pump to the inlet for the inlet (12) for pressurized coolant liquid.

The system accordingly comprises a closed loop for flow of said coolant. Hence, the coolant fluid is (e.g. for at least 90 wt. %) transported from the outlet (14) back to the inlet (12) through the loop.

The vaporization chamber (7) comprises a plurality of flow-modifying structures (9) that are arranged in series in the direction of the flow of coolant liquid (B). The flow-modifying structures are each configured for modifying the flow of the coolant liquid (B) and the coolant vapour (C) in said vaporization chamber (7). Each of said flow-modifying structures (9a, 9b, 9c) comprises a first part (10) that divides a channel (18a) for coolant in two channels (18b, 18c) for coolant, and a second part (11), arranged downstream of the first part (10), that combines at least two channels (18b, 18c) for coolant are combined into a single channel (18d) for coolant. In other words the first and second part are adapted for guiding the flow of coolant such that a stream is divided into two streams, and such that two coolant streams (in adjacent channels (18)) are combined into one stream. More in particular, the first part (10) is preferably a protrusion of the wall 6 that is diverging in the direction of the coolant flow, at the protrusion surface that contacts coolant in use, for the coolant flow the width/length plane (i.e. parallel to wall 6), and the second part 11 is converging.

The invention furthermore pertains to a vehicle (such as a car) comprising a combustion engine and such a heat recovery system. In the vehicle an outlet for exhaust gas of said combustion engine is connected with an inlet of said first chamber.

The system can also be applied e.g. to ships, trains, industrial plants, power plants and waste incinerators, typically having a combustion chamber or combustion engine with an outlet connected to the inlet for flue gas of the system. The system can also be used in connection with other heat sources such as solar plants and nuclear power plants wherein a fluid is heated and is supplied to the first chamber of the heat recovery system.

The invention accordingly further pertains to the use of the plurality of flow-modifying structures (9) for reducing the operating pressure of the system while avoiding explosive bubble growth, i.e. for reducing the minimum operating pressure of the system (or of the method) at which no explosive bubble growth occurs.

Some embodiments of the invention will now be further illustrated in the drawings, which do not limit the invention or the claims.

FIG. 1 shows an overview of an illustrative heat recovery system 100 with the heat exchanger 2, the expansion device 3, condenser 4, and pump 5, and the first fluid stream source 1 e.g. a combustion engine. The optional generator 21 connected to the expansion device 3 is also shown. The heat exchanger 2 comprises the vaporization chamber 7, the first chamber 8, and the heat exchanging wall 6 between them. Also shown are first fluid stream A (e.g. flue gas), coolant liquid B flowing from the pump 5 to the heat exchanger 2, in particular to the inlet 12 of the vaporization chamber 7, and the vapour C flowing from the outlet 14 to the expansion device 3. For the heat exchanger 2, the height h is perpendicular to the wall 6, the length l is parallel to the coolant flow in chamber 7, and the width is perpendicular to l and parallel to wall 6. The directions h, w and l (height, width, and length) are for heat exchanger 2 only and do not apply to units 3, 4 and 5. The system 100 is for instance included in a vehicle such as a car. Vaporization chamber 7 defines a heat exchanging zone.

FIG. 2A shows a schematic top view of the vaporization chamber 7 with structure 9 (a pillar) with first part 10 and second part 11 and channels 18 between the pillars (9a, 9b, 9c). The three pillars 9a, 9b, and 9c are arranged in series along the flow from first end 16 to second end 17, said ends 16 and 17 are of the vaporization chamber 7 defining a heat exchanging zone. Heat flow restriction 19 is a slot in casing 20. The pillars are shown as diamonds in top view, but many other shapes are also possible, such as ellipses and circles.

FIG. 2B shows an expanded top view of a pillar 9. At the first part 10 of pillar 9, a channel 18a is dived in two channels 18b and 18c that are separated by the pillar 9. At the second part 11 of pillar 9, the two channels 18b and 18c are combined into a channel 18d. Hence, liquid slugs in channel 18a are converted into an overall bubbly flow pattern or an annular flow in channels 18ba and 18c. The combination of first part 10 second part 11 provides for substantially the same width of the vaporization chamber over its length.

FIG. 2C shows an expanded top view of a pillar 9 which has a pillar width $P_w$ as maximum size in the width direction w and a pillar length $P_L$ as maximum size in the length direction L. The ratio pillar of the length $P_L$ to pillar width $P_w$ is illustrated as 1:1 and is generally less than 10:1 or less than 5:1.

FIG. 3 shows a top view of two staggered rows (22a, 22b) of pillars 9. After passing through the channels 18 between the pillars of the first row 22a, the coolant is broken up on the sharp edges of the pillars of the second row 22b.

Figure 4:
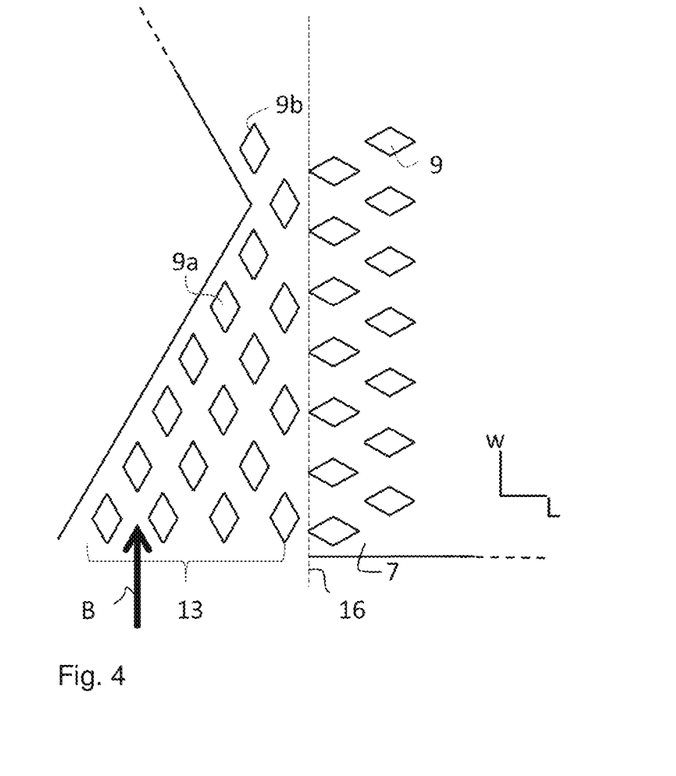
FIG. 4 shows a schematic top view of preferred staggered rows of pillars.

FIG. 4 shows a further top view of staggered rows of pillars (9a, 9b,9), wherein the pillars have different orientation so as to provide in part for an inlet manifold 13. The pillars (9a, 9b) in inlet manifold 13 have a different orientation from the pillars 9 in the vaporization chamber 7. In the inlet manifold 13, the pillars 9b are arranged for distributing the liquid B over the width direction (w). The first end 16 of heat exchanging zone is indicated between the inlet manifold 13 and the vaporization chamber 7 which chamber 7 provides the heat exchanging zone.

Figure 5A:
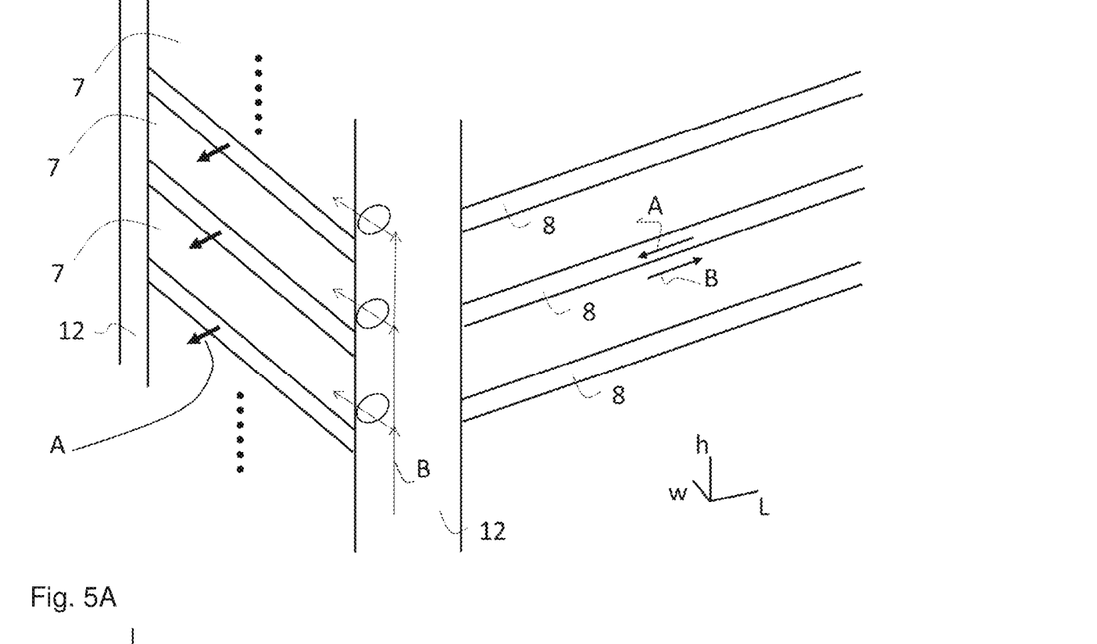

FIG. 5A shows a perspective view of an illustrative heat recovery system 100 with a stack of vaporization chambers 7 and first chambers 8. The coolant flow B is supplied through the inlet 12 to the chambers 7. The fluid stream A, e.g. flue gas, exits the chambers 8 typically at the same side (in the length direction) to provide for flow in chambers 8 counter-current with the coolant in chamber 7.

Figure 5B:
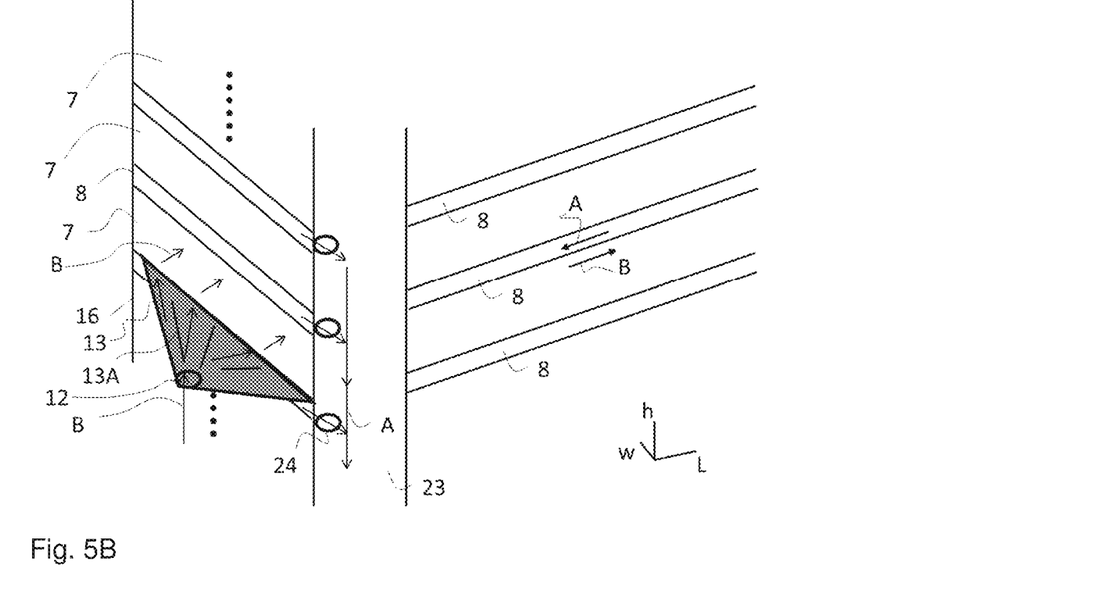

FIG. 5B shows a perspective view of a further embodiment based on that of FIG. 5A, wherein the fluid stream A (e.g. flue gas) exits through flue gas exit channels 23, which are arranged vertically to join the vertically spaced first chambers 8 through the flue gas outlet openings 24 which are provided at the sides (in width direction) of said chambers 8. The vaporization chambers 7 are provided in the length direction an inlet plenum 13, which is arranged more outwardly in the length direction than the sideward outlet opening 24 of the chamber 8 to channel 24 (and is located outwardly beyond the first end 16 of the heat exchanging zone), such that coolant B in said inlet plenum 13 is not in heat exchanging contact with the hot flue gas A. This helps to avoid bubble formation in the inlet plenum which is provided with liquid distributing elements 13A rather than flow-modifying structures.

Figure 6:
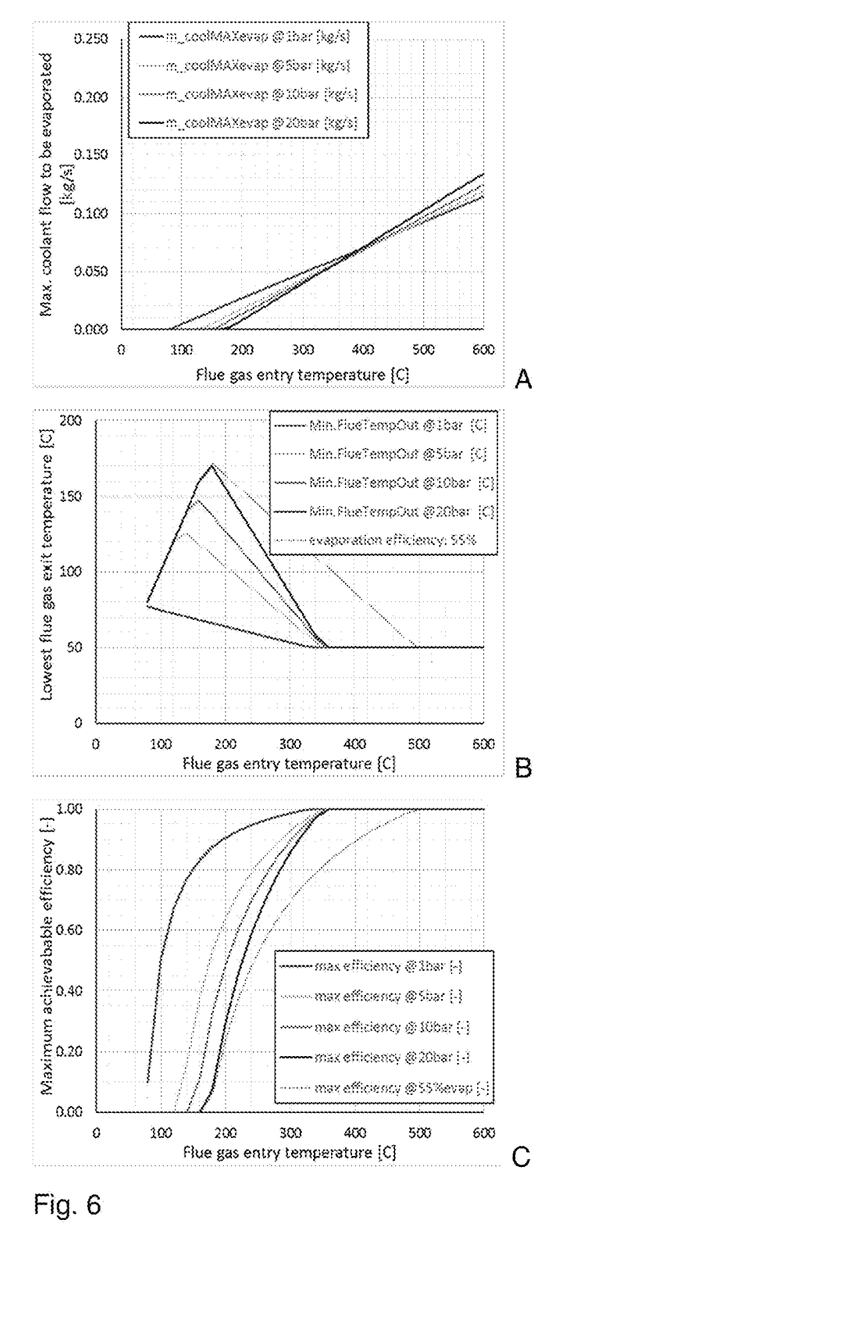
FIG. 6 shows example diagrams showing, as a function of the flue gas entry temperature, the max. coolant flow to be evaporated (6A), the lowest flue gas exit temperature (6B) and the maximum achievable efficiency (6C).

FIG. 6 shows that at lower pressures such as at 1 bar, a higher efficiency is achieved especially at lower flue gas entry temperatures. Panel A shows the maximum coolant flow to be evaporated (kg/s) as function of flue gas entry temperature, with up to about 400° C. the highest amount for 1 bar pressure. Panel B shows the flue gas exit temperature, with the lowest exit temperature for 1 bar. Panel C shows the efficiency, with highest efficiency for 1 bar. For 1 bar, boiling temperature T is 77° C., for 5 bar 129° C., for 10 bar 152° C., and for 20 bar 174° C.

In the figures, the references are as follows. To the extent that these references are also used in the description or in the claims, this use is illustrative only (showing possible example embodiments) and neither limits the invention nor limits the claimed subject-matter.
1. Engine (optional)
2. Heat exchanger
3. Expansion device
4. Condenser
5. Pump
6. Wall
7. Vaporization chamber
8. Flue gas chamber (first chamber)
9. Flow-modifying structures, preferably pillars
10. First part of flow-modifying structure
11. Second part of flow-modifying structure
12. Inlet for pressurized liquid coolant
13. Inlet plenum (13A: liquid distributing element)
14. Outlet for vapour
15. Outlet plenum
16. First end of heat exchanging zone (upstream end)
17. Second end of heat exchanging zone (downstream end)
18. Channels for coolant
19. Heat flow restriction
20. Casing
21. Generator
22. Row of pillars 9
23. Flue gas exit channel
24. Flue gas outlet opening
100. Heat recovery system
A. Flue gas (first fluid)
B. Coolant liquid
C. Coolant vapour
D. Coolant condensate
E. Pressurized coolant condensate

The invention claimed is:

1. A method for recovering heat from a flue gas from an engine, the method comprising:
supplying flue gas from the engine to a flue gas chamber of a heat exchanger, and supplying coolant liquid to a vaporization chamber of said heat exchanger, wherein said coolant liquid vaporizes in the vaporization chamber to give vapor,
using the vapor to drive an expansion device, thereby recovering said heat as mechanical work or electrical energy,
condensing the vapor in a condenser downstream of said expansion device to give condensate, pressurizing the condensate in a pump to give pressurized condensate, and supplying the pressurized condensate to the vaporization chamber as said coolant,
providing a casing for the vaporization chamber, wherein the casing comprising heat flow restrictions,
providing a heat exchanging wall between said flue gas chamber and said vaporization chamber, wherein said coolant liquid flows in contact with said heat exchanging wall in heat exchanging contact with flue gas in said flue gas chamber thereby causing vaporization of said coolant liquid,
providing a plurality of flow modifying structures in said vaporization chamber that extend from the heat exchanging wall and are arranged in series in a direction of the flow of coolant liquid and that are each configured for modifying the flow of the coolant liquid and the vapor in said vaporization chamber,
wherein each of said flow-modifying structures comprises:
a first part, wherein a channel for coolant is divided into at least two channels for coolant, and a second part, arranged downstream of the first part, wherein the at least two channels for coolant are combined into a single channel for coolant,
wherein said heat exchanger comprises:
an inlet for pressurized coolant liquid and an inlet plenum between said inlet and a first end of said vaporization chamber,
an outlet for vapor at an opposite second end of said vaporization chamber, wherein said first end and second end define a length of said vaporization chamber between them, and
an outlet plenum between said second end and said outlet.

2. The method according to claim 1, wherein said flow-modifying structures are protrusions extending from said heat exchanging wall into said vaporization chamber, and wherein said method further comprises:
   providing said protrusions in staggered rows of pillars; and
   distributing said rows over said length of the vaporization chamber; wherein in each row the pillars are distributed in width direction transversal to said length, and wherein for a pair of neighboring rows, the pillars have a different position in said width direction, such that the rows of pillars are staggered.

3. The method according to claim 1, wherein the method comprises flowing coolant liquid from said first end to said second end, and wherein at least part of said flowing coolant is subjected to multiple flow modifications while flowing in said vaporization chamber between said first end and said second end, wherein each flow modification comprises a step of dividing the flow of coolant into two streams, and a step of combining at least two streams of coolant into a single stream.

4. The method according to claim 2, wherein said vaporization chamber is provided between two stacked walls, at least one of the walls being the heat exchanging wall, wherein said pillars connect said walls.

5. The method according to claim 1, wherein the channels between two flow-modifying structures have a maximum dimension of less than 5.0 mm.

6. The method according to claim 1, wherein said heat exchanger comprises said outlet plenum between said second end and said outlet.

7. The method according to claim 1, wherein the coolant is or comprises ethanol, and wherein the method comprises evaporating in the heat exchanger at least 1.0 g coolant per second.

8. The method according to claim 7 wherein the coolant comprises ethanol and water.

9. The method according to claim 1, wherein the pressure in the vaporization chamber is 1 to 40 bar, and
   wherein the cooling liquid comprises a mixture of a first and a second component, wherein the second component is a compound having a higher volatility than the first component.

10. A heat recovery system comprising:
   a heat exchanger with a first chamber and a vaporization chamber and a heat exchanging wall between said chambers, and an inlet for pressurized coolant liquid and an outlet for coolant vapor, wherein said inlet and outlet are connected to said vaporization chamber, and wherein the first chamber has an inlet and an outlet for a first fluid stream,
   an expansion device connected to said outlet,
   a condenser for condensing vapor arranged downstream of said expansion device, with an outlet for condensate, and
   a pump for pressurizing the condensate, and a connection from said pump to said inlet,
   a casing for the vaporization chamber, wherein the casing comprising heat flow restrictions,
   wherein said vaporization chamber comprises a plurality of flow-modifying structures that extend from the heat exchanging wall and are arranged in series in a direction of the flow of coolant liquid and that are each configured for modifying the flow of the coolant liquid and the coolant vapor in said vaporization chamber,
   wherein each of said flow-modifying structures comprises:
   a first part, wherein a channel for coolant is divided into at least two channels for coolant, and a second part, arranged downstream of the first part, wherein the at least two channels for coolant are combined into a single channel for coolant,
   wherein said heat exchanger comprises
   an inlet for pressurized coolant liquid and an inlet plenum between said inlet and a first end of said vaporization chamber,
   an outlet for vapor at an opposite second end of said vaporization chamber, wherein said first end and second end define a length of said vaporization chamber between them, and
   an outlet plenum between said second end and said outlet,
   wherein said flow-modifying structures are protrusions of said wall into said vaporization chamber,
   wherein said vaporization chamber comprises as said protrusions staggered rows of pillars,
   wherein said rows are distributed over said length of the vaporization chamber,
   wherein in each row the pillars are distributed in width direction transversal to said length, and
   wherein for a pair of neighboring rows, the pillars have a different position in said width direction, such that the rows of pillars are staggered.

11. The heat recovery system according to claim 10, wherein said expansion device is coupled to a generator.

12. The heat recovery system according to claim 10, wherein said first part is a diverging protrusion in the coolant flow direction, and wherein said second part is a converging protrusion.

13. The heat recovery system according to claim 10, wherein comprising a stack of alternatingly first chambers and vaporization chambers separated by said wall.

14. A vehicle comprising a combustion engine and a heat recovery system according to claim 10 wherein an outlet for exhaust gas of said combustion engine is connected with an inlet of said first chamber.

15. A method for recovering heat from a flue gas from an engine, the method comprising:
   supplying flue gas from the engine to a flue gas chamber of a heat exchanger, and supplying coolant liquid to a vaporization chamber of said heat exchanger, wherein said coolant liquid vaporizes in the vaporization chamber to give vapor,
   using the vapor to drive an expansion device, thereby recovering said heat as mechanical work or electrical energy,
   condensing the vapor in a condenser downstream of said expansion device to give condensate, pressurizing the condensate in a pump to give pressurized condensate, and supplying the pressurized condensate to the vaporization chamber as said coolant,
   providing a casing for the vaporization chamber, wherein the casing comprising heat flow restrictions,
   providing a heat exchanging wall between said flue gas chamber and said vaporization chamber, wherein said coolant liquid flows in contact with said heat exchanging wall in heat exchanging contact with flue gas in said flue gas chamber thereby causing vaporization of said coolant liquid, and
   providing a plurality of flow modifying structures in said vaporization chamber that extend from the heat exchanging wall and are arranged in series in a direction of the flow of coolant liquid and that are each configured for modifying the flow of the coolant liquid and the vapor in said vaporization chamber, wherein each of said flow-modifying structures comprises:

a first part, wherein a channel for coolant is divided into at least two channels for coolant, and a second part, arranged downstream of the first part, wherein the at least two channels for coolant are combined into a single channel for coolant, wherein the channels between two flow-modifying structures have a maximum dimension of less than 5.0 mm.

16. A method for recovering heat from a flue gas from an engine, the method comprising:

supplying flue gas from the engine to a flue gas chamber of a heat exchanger, and supplying coolant liquid to a vaporization chamber of said heat exchanger, wherein said coolant liquid vaporizes in the vaporization chamber to give vapor, using the vapor to drive an expansion device, thereby recovering said heat as mechanical work or electrical energy, preferably using a generator, condensing the vapor in a condenser downstream of said expansion device to give condensate, pressurizing the condensate in a pump to give pressurized condensate, and supplying the pressurized condensate to the vaporization chamber as said coolant, providing a casing for the vaporization chamber, wherein the casing comprising heat flow restrictions, providing a heat exchanging wall between said flue gas chamber and said vaporization chamber, wherein said coolant liquid flows in contact with said heat exchanging wall in heat exchanging contact with flue gas in said flue gas chamber thereby causing vaporization of said coolant liquid, wherein said coolant liquid in said vaporization chamber and said flue gas in said flue gas chamber are in counter-current flow over said heat exchanging wall, and providing said heat exchanging wall of said vaporization chamber with a plurality of flow-modifying structures that extend from the heat exchanging wall and are arranged in series in a direction of the flow of coolant liquid and that are each configured for modifying the flow of the coolant liquid and the vapor in said vaporization chamber, wherein each of said flow-modifying structures comprises:

a first part, wherein a channel for coolant is divided into at least two channels for coolant, and a second part, arranged downstream of the first part, wherein the at least two channels for coolant are combined into a single channel for coolant.

17. The method of claim 1, wherein the expansion device is used to recover heat as electrical energy using a generator.

18. The method of claim 9, wherein the first component of the cooling liquid is water.

19. The method of claim 15, wherein the expansion device is used to recover heat as electrical energy using a generator.

20. The method of claim 1, wherein the heat exchanger is a plate-type heat exchanger.

* * * * *